(12) United States Patent
Dufour et al.

(10) Patent No.: US 10,502,254 B2
(45) Date of Patent: Dec. 10, 2019

(54) INTEGRAL NUT-RETAINING CRADLE FOR A NUT PLATE ASSEMBLY AND METHODS OF MANUFACTURING USING ADDITIVE MANUFACTURING

(71) Applicant: The Boeing Company, Chicago, IL (US)

(72) Inventors: Paul Dufour, O'Fallon, MO (US); Michael Hand, Huntington Beach, CA (US); Matthew Molitor, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 225 days.

(21) Appl. No.: 15/659,685

(22) Filed: Jul. 26, 2017

(65) Prior Publication Data

US 2019/0032697 A1    Jan. 31, 2019

(51) Int. Cl.
| | |
|---|---|
| *F16B 37/04* | (2006.01) |
| *B22F 3/105* | (2006.01) |
| *B22F 7/06* | (2006.01) |
| *B33Y 80/00* | (2015.01) |
| *B33Y 10/00* | (2015.01) |
| *B33Y 70/00* | (2015.01) |
| *B23K 26/342* | (2014.01) |
| *B23K 15/00* | (2006.01) |
| *B64F 5/10* | (2017.01) |
| *B62D 27/02* | (2006.01) |
| *B63B 17/00* | (2006.01) |

(52) U.S. Cl.
CPC .......... *F16B 37/044* (2013.01); *B22F 3/1055* (2013.01); *B22F 7/062* (2013.01); *B23K 15/0086* (2013.01); *B23K 26/342* (2015.10); *B33Y 10/00* (2014.12); *B33Y 70/00* (2014.12); *B33Y 80/00* (2014.12); *B62D 27/02* (2013.01); *B63B 17/00* (2013.01); *B64F 5/10* (2017.01); *F16B 37/04* (2013.01)

(58) Field of Classification Search
CPC ........ F16B 21/18; F16B 37/044; F16B 37/04; B33Y 10/00; Y10S 411/97; Y10S 411/969
USPC .......... 411/111, 112–113, 190, 352–353, 517
See application file for complete search history.

(56) References Cited

U.S. PATENT DOCUMENTS

| | | | | |
|---|---|---|---|---|
| 4,695,212 | A * | 9/1987 | Berecz | F16B 37/046 411/85 |
| 7,114,900 | B2 * | 10/2006 | Toosky | B21K 25/00 411/108 |
| 7,575,404 | B2 * | 8/2009 | Toosky | F16B 17/006 411/113 |

(Continued)

FOREIGN PATENT DOCUMENTS

| | | |
|---|---|---|
| EP | 3045739 A1 | 7/2016 |
| WO | 2007106801 A2 | 9/2007 |
| WO | 2012166532 A1 | 12/2012 |

OTHER PUBLICATIONS

European Search Report dated Dec. 18, 2012 in re Application No. EP 18 174 340.2-1010.

*Primary Examiner* — Roberta S Delisle
(74) *Attorney, Agent, or Firm* — Coats & Bennett, PLLC

(57) ABSTRACT

Additively manufactured parts are disclosed comprising an integral additively manufactured nut plate cradle, and methods of their manufacture and use in part and component installation and to facilitate joining parts and components to larger structures.

20 Claims, 6 Drawing Sheets

(56) References Cited

U.S. PATENT DOCUMENTS

| | | | | |
|---|---|---|---|---|
| 7,591,622 | B2 * | 9/2009 | de Jesus | F16B 37/044 |
| | | | | 411/108 |
| 7,802,952 | B2 * | 9/2010 | Toosky | F16B 17/006 |
| | | | | 411/113 |
| 7,823,262 | B2 * | 11/2010 | Toosky | F16B 37/044 |
| | | | | 29/402.03 |
| 7,921,539 | B2 * | 4/2011 | Woodall | F16B 37/041 |
| | | | | 29/525.01 |
| 8,383,028 | B2 | 2/2013 | Lyons | |
| 8,425,772 | B2 | 4/2013 | Martin et al. | |
| 8,883,064 | B2 * | 11/2014 | Jackson | B29C 67/0051 |
| | | | | 264/401 |
| 9,939,005 | B2 * | 4/2018 | Foenander | F16B 37/044 |
| 2012/0308332 | A1 * | 12/2012 | Jackson | B29C 67/0051 |
| | | | | 411/392 |
| 2014/0086704 | A1 * | 3/2014 | Hemingway | B29C 64/141 |
| | | | | 411/392 |

\* cited by examiner

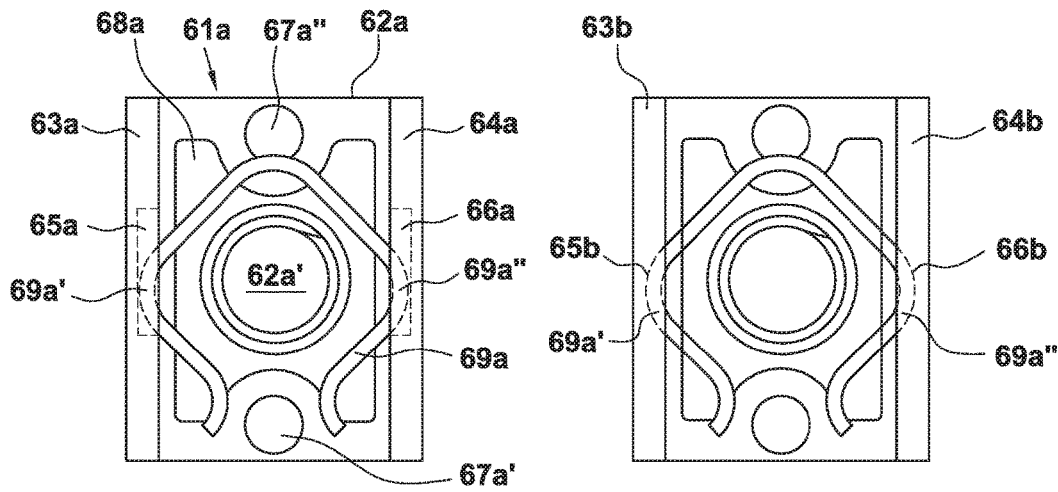
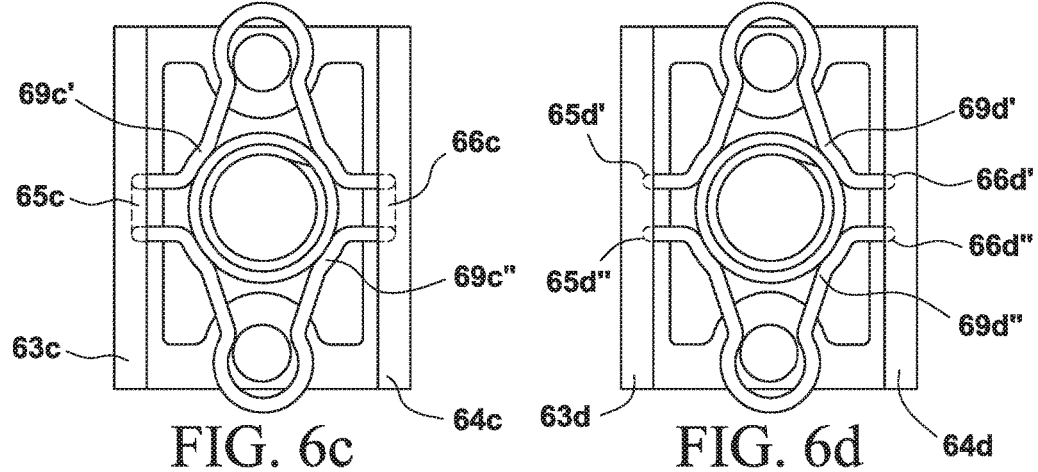
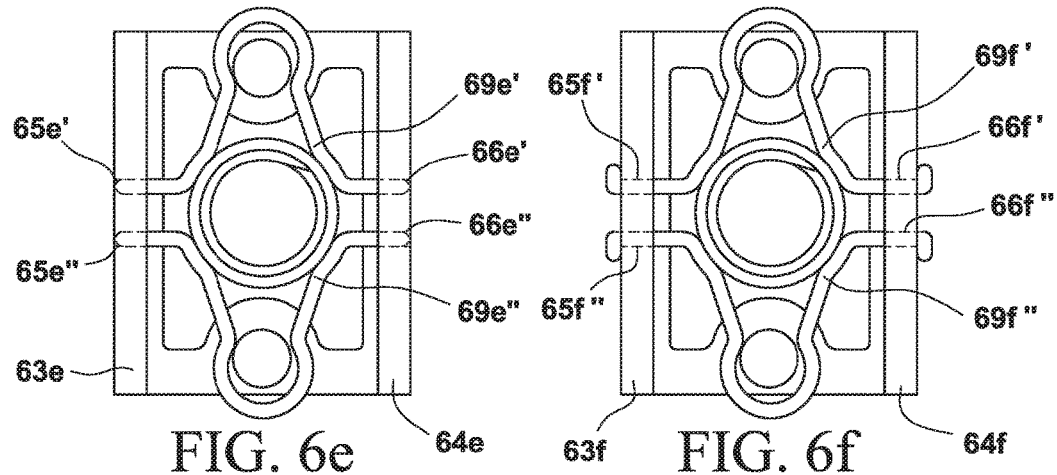
FIG. 6a  FIG. 6b  FIG. 6c  FIG. 6d  FIG. 6e  FIG. 6f

INTEGRAL NUT-RETAINING CRADLE FOR A NUT PLATE ASSEMBLY AND METHODS OF MANUFACTURING USING ADDITIVE MANUFACTURING

TECHNOLOGICAL FIELD

The present disclosure relates generally to the field of fasteners comprising a nut plate. More specifically, the present disclosure relates to components or parts that are manufactured using additive manufacturing processes.

BACKGROUND

Nut plate assemblies are discrete fittings fastened onto a component or part to threadably attach the component or part to other components, parts, structures, etc. Often nut plates facilitate assembly of parts to be joined and also disassembly of joined parts, such as may be required, for inspection or replacement of parts, etc. In nut plate assemblies, the threaded nut portion is incorporated into and/or is surrounded by an elongated portion or plate, the entire structure of which acts as the nut element in the fastener assembly. The nut element is positioned, often loosely, into a cradle element dimensioned to receive the nut element. The nut element and the cradle, together, are typically referred to as the "nut plate" or "nut plate assembly". Typically, nut plates are fastened to a part that is to be later joined to another part, or to a larger structure. Nut plates are physically joined, via rivets, into desired joining positions on a part. In this way, riveted nut plates are in position on a part, often in advance of further assembly of the part having the nut plate to another part.

Such rivet installation further requires that holes must be drilled with precision and often countersunk to allow an installed rivet to be substantially "flush" with a part surface after rivet installation. Such countersinking, if performed incorrectly can increase part waste, and the drilling itself, even if performed correctly, is labor-intensive further resulting in increased overall cost.

To retain the nut plate in position on a part, holes are drilled through a part from a first side of the part. The nut plate is then positioned such that the holes in the nut plate align with the drilled holes. A retention tool, such as a "deco", is used to temporarily assist in positioning sheets of material together, or to pieces such as stiffeners before the pieces are permanently joined. Clecos are installed in holes predrilled through the workpieces. Usually such holes are intended for permanent fasteners installed later. The deco expands on the far side of the workpieces and then draws and clamps the nut plate to the part temporarily while maintaining the desired alignment. Clecos prevent shifting of the workpieces and maintain the alignment of other "open" fastener holes that do not have clecos inserted in them (e.g. holding the nut plate in position relative to the component and keeping the holes in the component and the cradle element of the nut plate aligned.)

Typically, nut plates are installed into a structure when only one side of the structure will be easily accessible, or "open" for accepting tools (e.g., with respect to ease of securing the component to the structure with a fastening tool or tools), and where components are to be attached to the structure after the structure is in an installed orientation, and where at least one side of the structure is less accessible, or "closed". Aircraft and other vehicular structures present a particular application for the use of nut plates. Typically, the nut portion in a nut plate assembly is initially oriented in a nut plate cradle, or basket component, and the entire nut plate assembly is positioned on the interior, or "blind side" or "closed side" of a component. Once the nut plate is in position, the nut plate assembly is then securely affixed to the structure via rivets that are driven through the first side of the part, then into and through the nut plate.

In some nut plate assemblies, the nut is allowed to move slightly after installation, or "float", allowing for the nut to move slightly and accurately align with the bolt (that is to engage the nut). Across a typical aircraft, for example, joined structures may require the installation of thousands of nut plate assemblies, requiring the installation of thousands of rivets to secure the nut plate assemblies. Each nut plate installation therefore requires the procurement and use of special alignment tools (drills, clecos, etc.) followed by riveting operations that also require special tools. Therefore, nut plate installations result in a labor-intensive and time-consuming endeavor performed by skilled technicians that adds significant time and cost to the manufacture of such large structures, as well as adding to the total number of parts that must be maintained in inventory, while also adding steps and complexity to assembly protocols. Further, the presence of multi-part nut plate assemblies, and the rivets required to install such assemblies, adds significant overall weight to a large structure.

SUMMARY

Aspects of the present disclosure are directed to additively manufactured parts comprising features of a nut plate assembly additively manufactured integrally into the part additively manufactured, and methods of their manufacture, installation of the additively manufactured parts, and larger structures comprising the additively manufactured parts.

A further aspect of the disclosure is directed to a method for manufacturing a part, with the method comprising using an additive manufacturing process to construct a part, and forming a nut-retaining cradle for a nut plate assembly, with the nut-retaining cradle additively manufactured integrally with the part.

In another aspect, the additive manufacturing process includes direct energy deposition; direct metal laser sintering; direct metal printing; electron beam additive manufacturing; electron beam melting; electron beam powder bed manufacturing; fused deposition modeling; indirect powder bed manufacturing; laser cladding; laser deposition manufacturing; laser deposition welding; laser deposition welding/integrated milling; laser engineering net shaping; laser freeform manufacturing; laser metal deposition with powder; laser metal deposition with wire; laser powder bed manufacturing; laser puddle deposition; laser repair manufacturing; powder directed energy deposition; stereolithography; selective laser melting; selective laser sintering; small puddle deposition; and combinations thereof.

In another aspect, in the step of using an additive manufacturing process to construct a part, the part comprises a non-metallic material, with the non-metallic material including one or more of a thermoset plastic material; a thermoplastic material; a composite material; a ceramic material; a carbon-fiber containing material; a boron fiber-containing material; a glass fiber-containing material; an aramid fiber-containing material; polytetrafluoroethylene; polyethylene terephthalate; glycol modified polyethylene terephthalate; and combinations thereof.

In a further aspect, in the step of using an additive manufacturing process to construct a part, the part comprises a metallic material, with the metallic material including one or more of titanium; a titanium alloy; steel; aluminum; an aluminum alloy; cobalt; a cobalt alloy; bronze; copper; a copper alloy; and combinations thereof.

In a further aspect, in the step of forming a nut-retaining cradle, the nut-retaining cradle is dimensioned to orient a nut.

A further aspect is directed to a part manufactured by a method comprising using an additive manufacturing process to construct a part, and forming a nut-retaining cradle for a nut plate assembly, with the cradle additively manufactured integrally with the part.

In another aspect, an additive manufactured part is disclosed, with the part comprising an additively manufactured nut-retaining cradle integral with the additive manufactured part, with the integral nut-retaining cradle comprising an integral cradle bed and at least one integral cradle wall, with the integral cradle wall extending substantially perpendicularly from the integral cradle bed and extending to a predetermined distance from the integral cradle bed, and wherein the integral cradle wall comprises at least one integral cradle wall nut-retaining feature, with the integral cradle wall nut-retaining feature configured to receive a retainer, with the retainer configured to engage the integral cradle wall nut-retaining feature, and with the integral cradle wall nut-retaining feature further configured to establish a restricted range of movement for a nut retained in the nut-retaining cradle along at least one axis.

In another aspect, the integral cradle wall nut-retaining feature comprises at least one recess.

In another aspect, the recess extends through the integral nut-retaining cradle wall.

In a further aspect, the recess extends through the integral nut-retaining cradle wall.

In another aspect, the recess comprises a through-slot extending through the integral nut-retaining cradle wall.

In another aspect, the retainer comprises a clip, a pin, a continuous ring, a discontinuous ring, or combinations thereof.

In a further aspect, the nut comprises a floating nut.

In another aspect, the integral cradle bed comprises at least one integral cradle bed nut-orienting feature, with the cradle bed nut-orienting feature configured to establish a restricted range of movement for a nut retained in the integral cradle and the integral cradle bed along at least one axis.

In another aspect, the integral cradle bed nut-orienting feature comprises a post, with the post extending substantially perpendicularly a predetermined distance from the integral cradle bed.

In a further aspect, the integral cradle bed comprises a predetermined thickness.

In another aspect, the integral cradle bed comprises an upper surface and the cradle bed upper surface extends to a predetermined distance from a surface of the part integrally formed with the nut-retaining cradle.

In another aspect, the cradle bed upper surface is substantially flush with a surface of the part additively manufactured and integrally formed with the integral nut-retaining cradle.

In a further aspect, the part comprises a non-metallic material, with the non-metallic material including one or more of a thermoset plastic material; a thermoplastic material; a composite material; a ceramic material; a carbon-fiber containing material; a boron fiber-containing material; a glass fiber-containing material; an aramid fiber-containing material; polytetrafluoroethylene; polyethylene terephthalate; glycol modified polyethylene terephthalate; and combinations thereof.

In another aspect, the part comprises a metallic material, with the metallic material including one or more of titanium; a titanium alloy; steel; aluminum; an aluminum alloy; cobalt; a cobalt alloy; bronze; copper; a copper alloy; and combinations thereof.

A further aspect of the present disclosure is directed to a component comprising an additive manufactured part, with the part comprising additive manufactured nut-retaining cradle integral with the additive manufactured part, with the nut-retaining cradle comprising a cradle bed and at least one cradle wall, with the cradle wall extending substantially perpendicularly from the cradle bed and extending to a predetermined distance from the cradle bed, and wherein the cradle wall comprises at least one integral cradle wall nut-retaining feature, with the integral cradle wall nut-retaining feature configured to receive a retainer, with the retainer configured to engage the integral cradle wall nut retaining feature, and with the integral cradle wall nut-retaining feature further configured to establish a restricted range of movement for a nut retained in the nut-retaining cradle along at least one axis.

A further aspect is directed to a structure comprising the component.

In another aspect, the structure comprises a stationery structure.

In a further aspect, the structure comprises a vehicle.

In another aspect, the vehicle includes one or more of a manned aircraft; an unmanned aircraft; a manned spacecraft, an unmanned spacecraft, a manned rotorcraft, an unmanned rotorcraft, a manned terrestrial vehicle, an unmanned terrestrial vehicle, a manned surface waterborne vehicle, an unmanned surface water-borne vehicle; a manned sub-surface water-borne vehicle, an unmanned sub-surface water-borne vehicle, a satellite, a rocket, a missile, and combinations thereof.

Another aspect is directed to a method for installing a joining assembly comprising joining an additively manufactured part to a nut, with the part comprising an additively manufactured nut-retaining cradle integral with the additively manufactured part, with the nut-retaining cradle dimensioned to receive the nut and a nut retainer, positioning the nut retainer in the nut-retaining cradle, and installing the joining assembly.

In a further aspect, the nut plate is a rivetless nut plate.

A further aspect is directed to a method for joining parts comprising joining an additively manufactured part to a nut, with the part comprising an additively manufactured nut-retaining cradle integral with the additively manufactured part, with the nut-retaining cradle dimensioned to receive the nut and a nut retainer, positioning the nut retainer in the nut-retaining cradle, and joining the part to another part.

A further aspect is directed to a method for joining a part to a structure comprising joining an additively manufactured part to a nut, with the part comprising an additively manufactured nut-retaining cradle integral with the additively manufactured part, with the nut-retaining cradle dimensioned to receive the nut and a nut retainer, positioning the nut retainer in the nut-retaining cradle, and joining the part to a structure.

The features, functions and advantages that have been discussed can be achieved independently in various aspects or may be combined in yet other aspects further details of which can be seen with reference to the following description and the drawings.

BRIEF DESCRIPTION OF THE DRAWINGS

Figure 1:
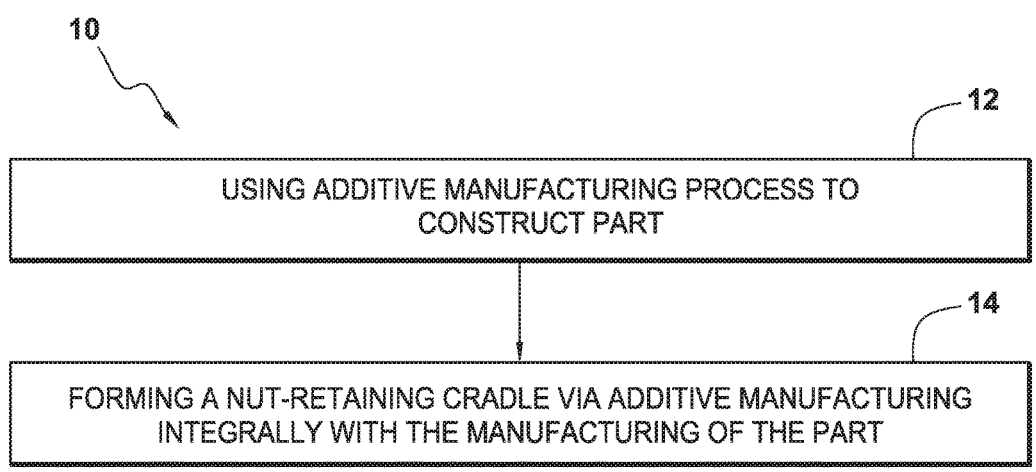
Figure 2A:
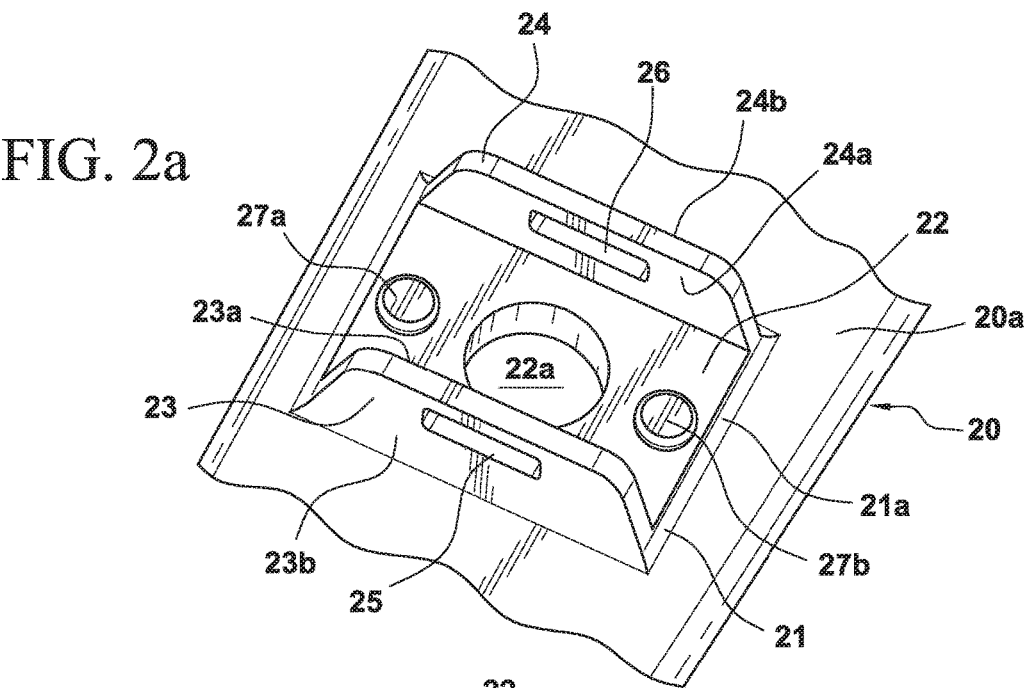
Figure 3A:
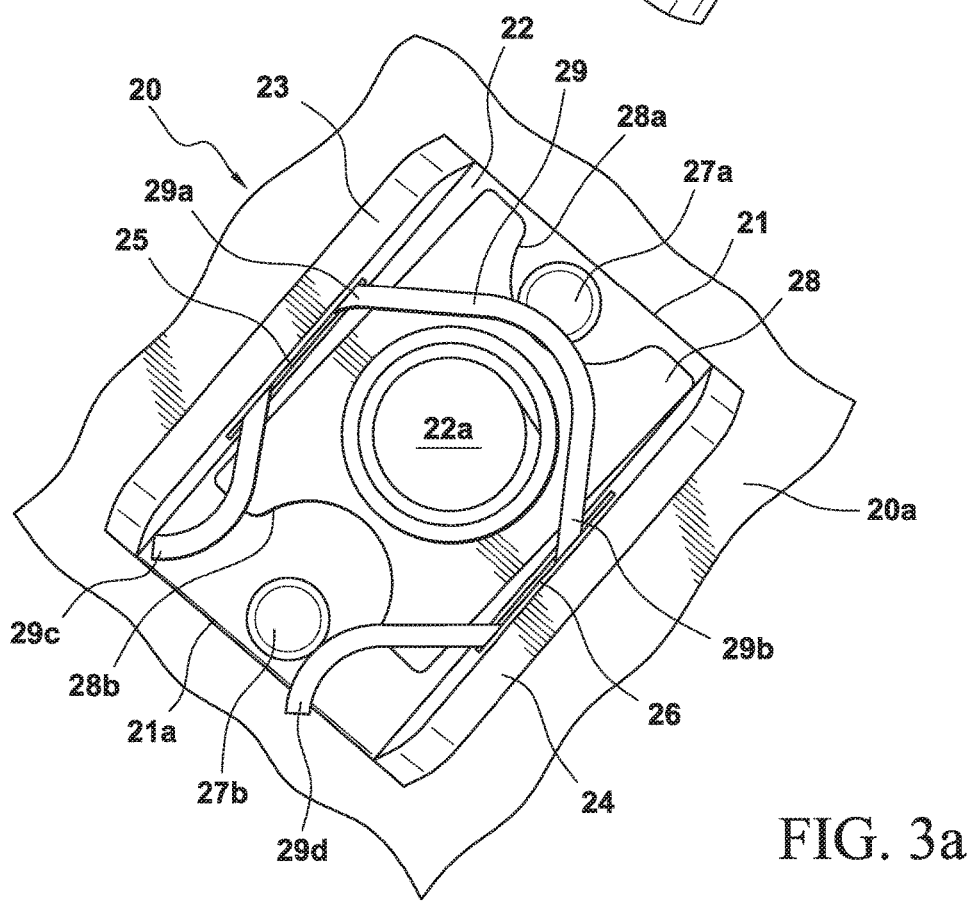
Figure 2B:
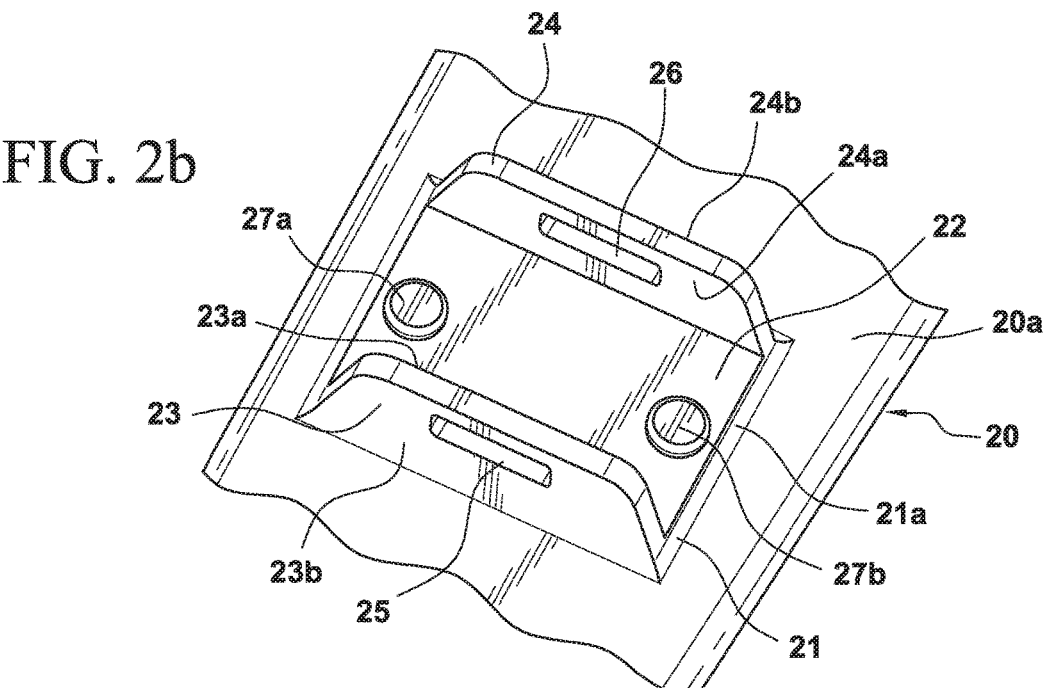
Figure 3B:
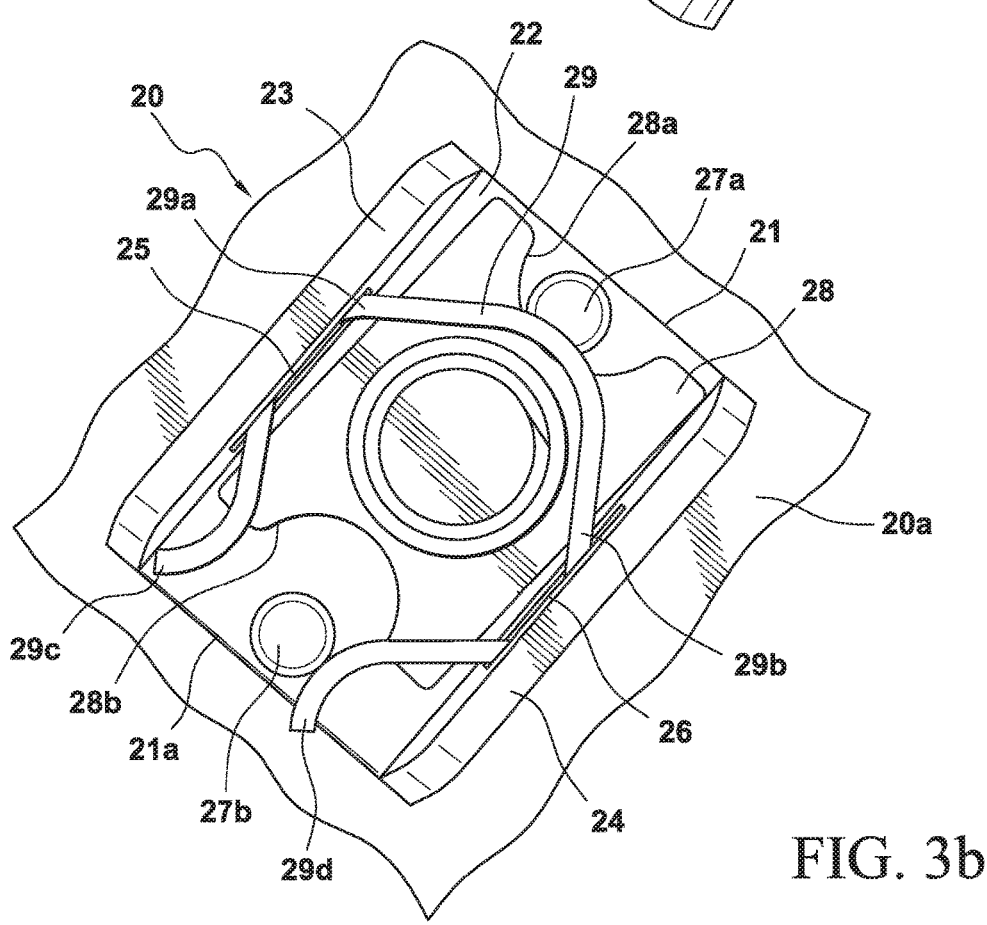
Figure 4:
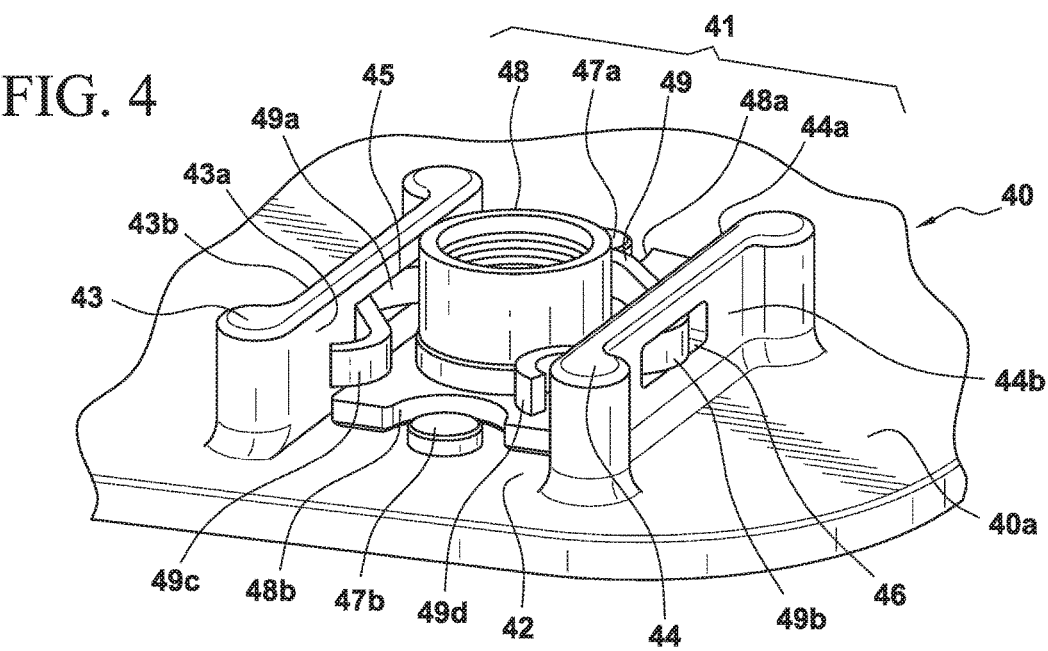
Figure 5:
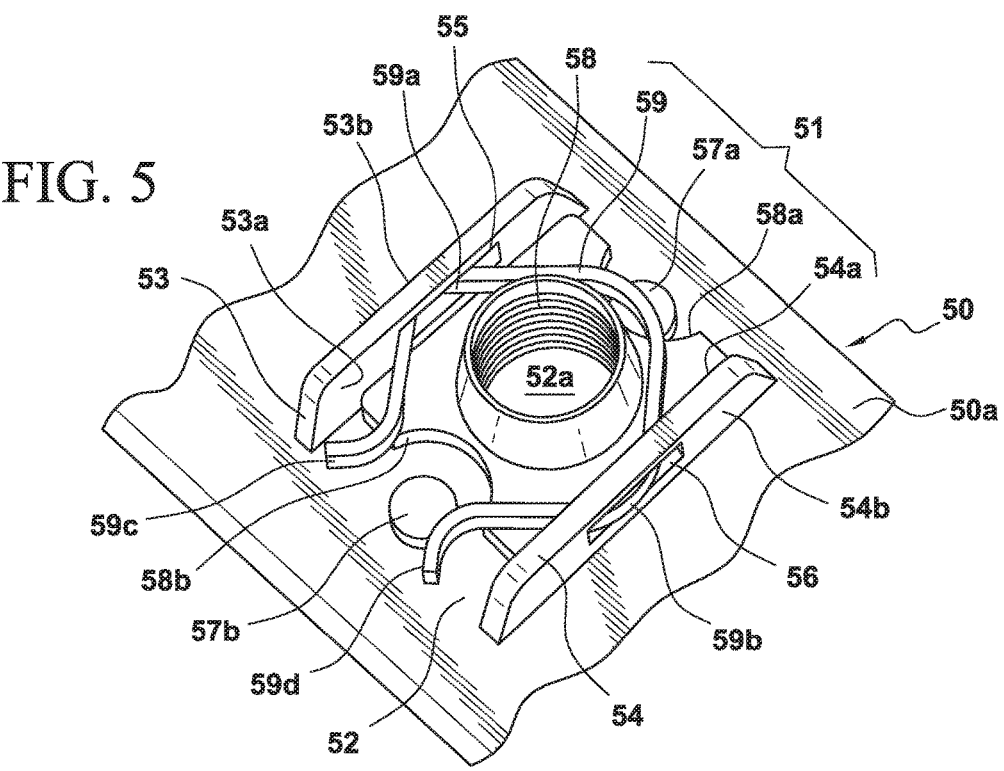
Figure 7:
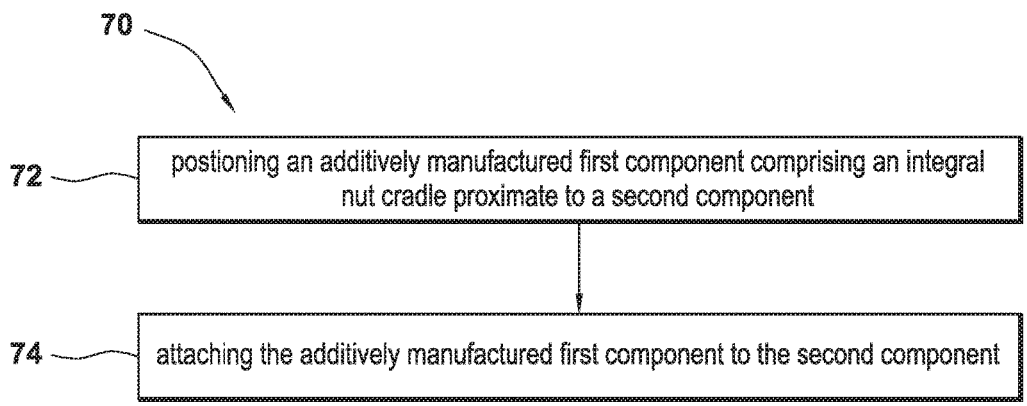

Having thus described variations of the disclosure in general terms, reference will now be made to the accompanying drawings, which are not necessarily drawn to scale, and wherein:

FIG. 1 is a flowchart pertaining to an aspect of the present disclosure;

FIGS. 2a and 2b are perspective views showing aspects of the present disclosure;

FIGS. 3a and 3b are perspective views showing further aspects of the present disclosure;

FIG. 4 is an enlarged perspective view showing further aspects of the present disclosure;

FIG. 5 is a perspective view showing further aspects of the present disclosure;

FIGS. 6a-6f show perspective views of retaining elements according to further aspects of the present disclosure;

FIG. 7 is a flowchart pertaining to an aspect of the present disclosure; and

Figure 8:
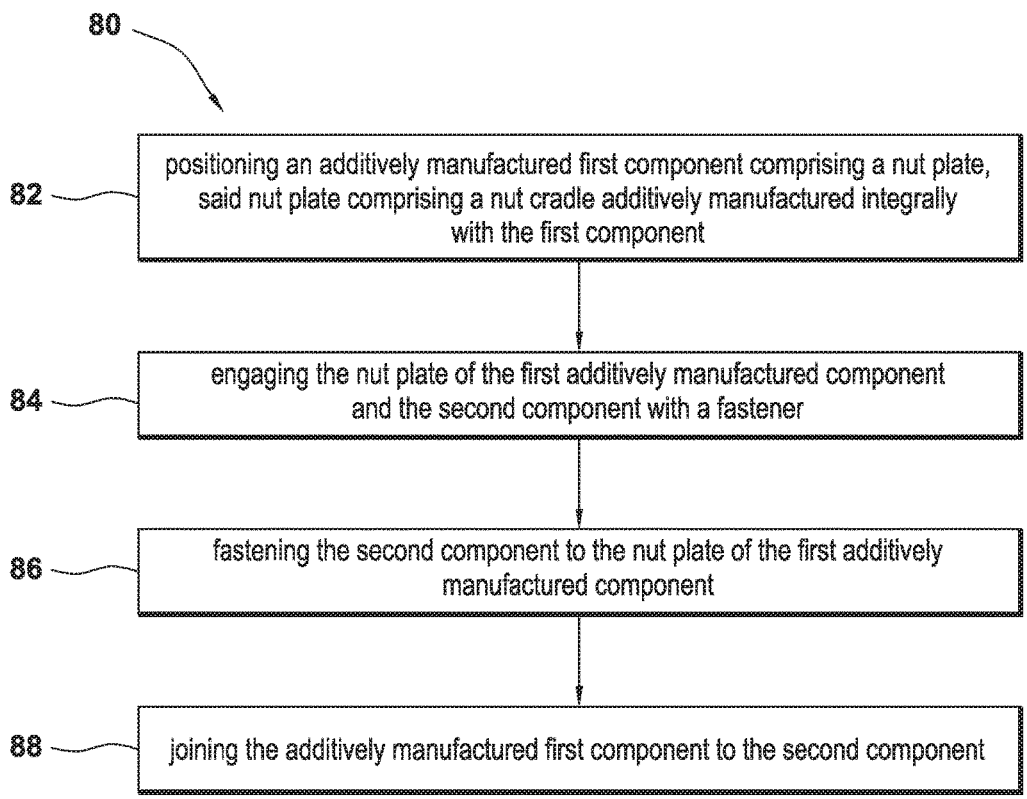

FIG. 8 is a flowchart pertaining to a further aspect of the present disclosure.

DETAILED DESCRIPTION

Aspects of the present disclosure are directed to additively manufactured parts comprising integral features of a nut plate assembly; particularly an integral nut-retaining cradle, and methods for their manufacture.

According to further aspects of the present disclosure, methods are disclosed that obviate the need for rivets or drilling holes for rivet that would need to be carefully countersunk so as to allow an installed rivet to be substantially "flush" with a part surface after rivet installation.

As shown in FIG. 1, a method 10 is disclosed comprising using 12 an additive manufacturing process to construct an additively manufactured part. Such additive manufacturing processes or "3D manufacturing" processes can be used to progressively deposit extremely thin layers of material to create an three-dimensional object from a computer assisted drawing (CAD) file or file formats that include Additive Manufacturing file (AMF) format. Additive manufacturing (AM) is understood as referring to processes used to create a three-dimensional (3D) object where layers of material are formed, typically under computer control, to create an object. Objects can be of almost any shape or geometry and are produced using digital model data from a 3D model or another electronic data source such as an AMF format. Therefore, compared to removing material from a stock piece, as may be done in a conventional machining process to form a part, 3D printing or AM builds a three-dimensional object from a computer-aided design (CAD) model or an AMF or STL file format by successively adding material layer-by-layer to accurately produce a part having a desired and/or predetermined dimension and/or geometry. As shown in FIG. 1, a method is disclosed further comprising forming 14 an additively manufactured nut-retaining cradle integrally with the part using additive manufacturing of the part and the integrally formed and additively manufactured nut-retaining features.

The term "3D printing" originally referred to a process that deposits a binder material onto a powder bed with inkjet printer inkjet printer heads layer-by-layer. More recently, the term is being used in popular vernacular to encompass a wider variety of additive manufacturing techniques. United States and global technical standards use the term "additive manufacturing" in this broader sense. For example, standard ISO/ASTM52900-15 defines seven categories of AM processes within its meaning: binder jetting, directed energy deposition, material extrusion, material jetting, powder bed fusion, sheet lamination and vat photopolymerization.

As a result, aspects of the present invention contemplate the use of many additive manufacturing processes are known for depositing metallic and non-metallic materials to form an additive manufactured product. A non-exhaustive list of such processes includes, without limitation, direct energy deposition; direct metal laser sintering; direct metal printing; electron beam additive manufacturing; electron beam melting; electron beam powder bed manufacturing; fused deposition modeling; indirect powder bed manufacturing; laser cladding; laser deposition manufacturing; laser deposition welding; laser deposition welding/integrated milling; laser engineering net shaping; laser freeform manufacturing; laser metal deposition with powder; laser metal deposition with wire; laser powder bed manufacturing; laser puddle deposition; laser repair manufacturing; powder directed energy deposition; stereolithography; selective laser melting; selective laser sintering; small puddle deposition; or combinations thereof.

Therefore, a large number of additive processes are available. The main differences between processes are in the way layers are deposited to create parts and in the materials that are used. Some methods melt or soften the material to produce the layers. For example, in fused filament fabrication, also known as fused deposition modeling (FDM), the part is produced by extruding small beads or streams of material which harden immediately to form layers. A filament of thermoplastic material, or metal in the form of metal wire, or other material is fed into an extrusion nozzle head (e.g. a 3D printer extruder), that heats the material and produces a deposit material flow. Another technique fuses parts of the layer and then moves "upward" in the working area, adding successive layers of granules, and repeating the process until the piece has "built up". This process uses the unfused media to support overhangs and thin walls in the part being produced, reducing the need for temporary auxiliary supports for the piece.

Laser sintering techniques include, without limitation, selective laser sintering with both metals and polymers, and direct metal laser sintering. Selective laser melting does not use sintering for the fusion of powder granules, but will completely melt the powder using a high-energy laser to create fully dense materials in a layer-wise deposition method that has mechanical properties similar to those of conventional manufactured metals. Electron beam melting is a similar type of additive manufacturing technology for metal parts (e.g. titanium, titanium alloys). EBM manufactures parts by melting metal powder layer by layer with an electron beam in a high vacuum. Another method consists of an inkjet 3D printing system that creates the part one layer at a time by spreading a layer of powder (plaster or resins) and printing a binder in the cross-section of the part using an inkjet-like process. With laminated object manufacturing, thin layers are cut to shape and joined together.

Other methods cure liquid materials using different sophisticated technologies, such as sterolithography. Photopolymerization is primarily used in stereolithography to produce a solid part from a liquid. Inkjet printer systems like the Objet PolyJet system spray photopolymer materials onto a build tray in ultra-thin layers (e.g., between 16 μm and 30 μm) until the part is completed. Each photopolymer layer is cured with UV light after it is jetted, producing fully cured models that can be handled and used without post-curing. Further, ultra-small features can be made with the 3D micro-fabrication technique used in multiphoton photopolymerization. Due to the nonlinear nature of photo excitation, a gel is cured to a solid only in the places where the laser was focused while the remaining gel is removed. Feature sizes of under 100 nm can be produced, as well as complex structures that can comprise moving and interlocked parts.

Yet another approach uses a synthetic resin that is solidified using LEDs. In Mask-image-projection-based stereolithography, a 3D digital model is sliced by a set of horizontal planes. Each slice is converted into a two-dimensional mask image. The mask image is then projected onto a photocurable liquid resin surface and light is projected onto the resin to cure it in the shape of the layer. Continuous liquid interface production begins with a reservoir of liquid photopolymer resin. Part of the reservoir is transparent to ultraviolet light, causing the resin to solidify.

In powder-fed directed-energy deposition, a high-power laser is used to melt metal powder supplied to the focus of the laser beam. The powder fed directed energy process is similar to Selective Laser Sintering, but the metal powder is applied only where material is being added to the part at that moment.

FIG. 2a is a perspective view of an aspect of the present disclosure showing an additively manufactured part 20 comprising an additively manufactured integral nut-retaining cradle 21. The integral nut-retaining cradle 21 comprises an integral cradle bed 22 and integral cradle walls 23 and 24 extending a predetermined distance from integral cradle bed 22 with the integral cradle walls 23, 24 built via additive manufacturing and oriented substantially perpendicular to the integral cradle bed 22. According to one aspect as shown, integral cradle bed 22 defines an opening 22a defined and bounded by integral cradle bed 22 and part 20 and extending through the integral cradle bed 22 and through integral part 20. Integral cradle walls 23, 24 comprise through-slots 25, 26, respectively. Through-slots 25, 26 are understood to extend from integral cradle wall inner surfaces 23a, 24a through the thickness of integral cradle walls 23, 24 to integral cradle wall outer surfaces 23b, 24b, respectively. Integral cradle bed 22 as shown in FIG. 2a further comprises integral cradle bed nut-retaining features 27a, 27b extending (e.g., in a "raised" fashion) a predetermined distance from, and with respect to, integral cradle bed 22.

FIG. 2b is a perspective view of an aspect of the present disclosure showing an additively manufactured part 20 with all numbered aspects similar to those shown in FIG. 2a, with the exception that the opening 22a is absent. That is, in the aspect of the disclosure illustrated in FIG. 2b, there exists no opening 22a defined and bounded by integral cradle bed 22 and part 20 and extending through the integral cradle bed 22 and through integral part 20 as shown in FIG. 2a. According to this aspect, the additively manufactured integral nut-retaining cradle is printed without opening 22a. It is to be understood that an opening may later be drilled after printing, for example, as a post-processing operation.

FIG. 3a is a perspective view of an aspect of the present disclosure showing the additively manufactured part 20 of FIG. 2a further comprising nut 28 inserted proximate to integral nut-retaining cradle 21 and resting on integral cradle bed 22 and bounded on two sides by integral cradle walls 23, 24. Nut depression 28a is shown resting proximate to integral cradle bed nut-orienting feature 27a. As shown in FIG. 3a, nut depression 28b does not rest immediately proximate to integral cradle bed nut-orienting feature 27b. In this way, as illustrated in FIG. 3a, nut 28 is allowed to move or "float" slightly while being retained proximate to integral cradle bed 22.

FIG. 3b is a perspective view of an aspect of the present disclosure showing an additively manufactured part 20 with all numbered aspects similar to those shown in FIG. 3a, with the exception that the opening 22a is absent. That is, in the aspect of the disclosure illustrated in FIG. 3b, there exists no opening 22a defined and bounded by integral cradle bed 22 and part 20 and extending through the integral cradle bed 22 and through integral part 20 as shown in FIG. 3a. According to this aspect, the additively manufactured integral nut-retaining cradle is printed without opening 22a. It is to be understood that an opening may later be drilled after printing, for example, as a post-processing operation.

Nut 28 is allowed to move slightly or "float" in a direction substantially parallel to the integral cradle walls 23, 24 within integral cradle bed 22, but is restricted from moving excessively in such direction before impacting, and being restricted in movement in such direction by, integral cradle bed nut-orienting features 27a, 27b. Retainer 29 is shown in FIGS. 3a and 3b as resting proximate to nut 28 with retainer section 29a engaging through-slot 25 of integral cradle wall 23 and retainer section 29b engaging through-slot 26 of integral cradle wall 24. Retainer ends 29c and 29d are dimensioned and/or geometrically configured to impact integral cradle walls 23, 24 respectively, and retain nut 28 proximate to internal cradle bed 22. That is, the predetermined dimension and/or geometry of retainer 29 is such that retainer 29 remains in position in the integral nut-retaining cradle 21 and proximate to the nut 28, thus retaining the nut 28 in the integral nut-retaining cradle 21.

The geometric shape of retainer 29, as shown in FIGS. 3a and 3b is an "open" or "discontinuous" rectangular shape. The geometric orientation and predetermined dimension of the retainer 29 enables the retainer 29 to remain in position proximate to nut 28, and serves to hold or retain nut 28 in a predetermined orientation within the integral nut-retaining cradle 21. That is, the dimension of the retainer 29 is such that, when retainer section 29a of retainer 29 engages through-slot 25 of integral cradle wall 23 and retainer section 29b of retainer 29 engages through-slot 26 of integral cradle wall 24, the retainer 29 is able to maintain a relative desired and predetermined position that retains nut 28 in a desired and predetermined location in the integral cradle 21, and substantially proximate to integral cradle bed 22, even though nut 28 may be allowed to move slightly, or "float", a predetermined distance within the integral cradle bed 21 in the direction substantially parallel to the integral cradle walls 23, 24 and/or move or "float" a slight predetermined distance in the direction substantially perpendicular to the integral cradle walls 23, 24. This "floating" movement of the nut 28 relative to its position within the nut-retaining cradle 21 allows the nut 28 to move slightly within the nut-retaining cradle in a manner required of a nut in a nut plate assembly during the alignment of the nut that will take place, for example, during a fastening operation, such as when a mating fastener is introduced into the nut as the part 20 is fastened to another part, component, structure, etc. As further shown in FIGS. 2a, 2b, 3a, and 3b, the integral cradle bed 22 additively manufactured integrally with the additively manufactured part 20 is shown as being "raised" a predetermined distance from the part surface 20a of the part 20, to create and include an integral nut-retaining cradle raised base 21a (as shown in FIGS. 2a and 2b). The thickness of the base can be tailored and additively manufactured integrally with the part as desired and in a predetermined fashion to impart a required or desired robustness in terms of reinforcing an area of a part placed under added stress at locations where the part is to be joined to other parts, components, structure, etc.

FIG. 4 is an enlarged perspective view of an additively manufactured part 40 comprising an integral and additively manufactured nut-retaining cradle 41. As shown in FIG. 4, the integral nut-retaining cradle 41 comprises an integral cradle bed 42 and integral cradle walls 43 and 44 extending a predetermined distance from integral cradle bed 42 with the integral cradle walls 43, 44 built via additive manufacturing and oriented substantially perpendicular to the integral cradle bed 42. According to one aspect as shown in FIG. 4, integral cradle bed 42 defines an integral cradle bed opening (not shown or visible in FIG. 4) extending through the integral cradle bed 42 and through integral part 40. According to an alternate aspect, integral nut-retaining cradle 41 may be additively manufactured with part 40 without an integral cradle bed opening, if desired. Integral cradle walls 43, 44 comprise through-slots 45, 46, respectively through cradle walls 43, 44. Through-slots 45, 46 are understood to extend from integral cradle wall inner surfaces 43a, 44a through the thickness of integral cradle walls 43, 44 to integral cradle wall outer surfaces 43b, 44b, respectively. Integral cradle bed 42 as shown in FIG. 4 further comprises integral cradle bed nut-retaining features 47a, 47b extending a predetermined distance from integral cradle bed 42, or in a "raised" fashion with respect to the integral cradle bed 42. Integral cradle bed 42 as shown in FIG. 4 differs from integral cradle bed 22 shown in FIGS. 2a, 2b,3a, and 3b in that the integral cradle bed 42 is not "raised" from the surface of the part 40. As shown in FIG. 4, integral cradle bed surface 42 is substantially flush with part surface 40a of part 40.

Retainer 49 is shown in FIG. 4 as positioned proximate to nut 48 with retainer section 49a engaging through-slot 45 of integral cradle wall 43 and retainer section 49b engaging through-slot 46 of integral cradle wall 44. Retainer ends 49c and 49d are dimensioned and/or geometrically configured to impact integral cradle walls 43, 44 respectively. That is, the predetermined dimension and/or geometry of retainer 49 is such that retainer 49 remains in position in the integral nut-retaining cradle 41 and proximate to the nut 48, thus retaining the nut 48 in the integral nut-retaining cradle 41.

As shown in FIG. 4, integral cradle walls 43, 44 are shown comprising a non-uniform, or varying wall thickness along their length. The predetermined dimension and predetermined geometry of the integral cradle walls 43, 44, as well as the entire cradle 41, are tailored to achieve a desired and predetermined degree of robustness relative to required or desired structural performance of the additively manufactured part comprising the integral additively manufactured integral cradle walls 43, 44. According to an aspect, the cradle walls 43, 44 assist in withstanding physical forces sustained during a fastening operation of a part during part installation, as a fastener dimensioned to securely mate with the nut engages the nut and proceeds during a fastening operation to a desired tightness. Such forces include, for example and without limitation, torque, material stresses, material fatigue, etc. Further, the material (e.g. metallic-containing material, non-metallic-containing material) used to make the additively manufactured part may further impact the useful dimensions and geometry of the integral cradle bed and its attendant additively manufactured features.

FIG. 5 is a further perspective view of an additively manufactured part comprising an aspect of the present disclosure showing an additively manufactured part 50 comprising an integral additively manufactured nut-retaining cradle 51. The nut-retaining cradle 51 comprises an integral cradle bed 52 and integral cradle walls 53 and 54 extending a predetermined distance from integral cradle bed 52 with the integral cradle walls 53, 54 built via additive manufacturing and oriented substantially perpendicular to the integral cradle bed 52. According to one aspect as shown, integral cradle bed 52 defines an opening 52a extending through the integral cradle bed 52 and through integral part 50. According to an alternate aspect (not shown in FIG. 5), integral nut-retaining cradle 51 may be additively manufactured with part 50 without an integral cradle bed opening 52a, if desired. Integral cradle walls 53, 54 comprise through-slots 55, 56, respectively. Through-slots 55, 56 are understood to extend from integral cradle wall inner surfaces 53a, 54a through the thickness of integral cradle walls 53, 54 to integral cradle wall outer surfaces 53b, 54b, respectively.

Integral cradle bed 52, as shown in FIG. 5, further comprises integral cradle bed nut-retaining features 57a, 57b extending a predetermined distance from integral cradle bed 52, or in a "raised" fashion with respect to the integral cradle bed 52. As with the integral cradle bed 42 shown in FIG. 4, integral cradle bed 52 as shown in FIG. 5 also differs in configuration from the integral cradle bed 22 shown in FIGS. 2a, 2b, 3a and 3b, in that the integral cradle bed is not "raised" to any predetermined distance from and/or "above" the part surface 50a. In other words, as shown in FIG. 5, integral cradle bed 52 is additively manufactured integrally with part 50 to remain substantially flush with part surface 50a of part 50.

Retainer 59 is shown in FIG. 5 as positioned proximate to nut 58 with retainer section 59a engaging through-slot 55 of integral cradle wall 53 and retainer section 59b engaging through-slot 56 of integral cradle wall 54. Retainer ends 59c and 59d are dimensioned and/or geometrically configured to impact integral cradle walls 53, 54 respectively. In an aspect, the predetermined dimension and/or geometry of retainer 59 is such that retainer 59 remains in position in the integral cradle bed 52 of integral nut-retaining cradle 51 and proximate to the nut 58, thus retaining the nut 58 in the integral nut-retaining cradle 51.

As shown in FIGS. 3a, 3b, 4 and 5, the geometric shape of retainers 29, 49, 59 is "open" or "discontinuous" rectangular shape. The geometric orientation and/or predetermined dimension of the retainer enables the retainer to remain in position proximate to, and serving to hold or retain nut 28, 48, 58 respectively in a predetermined orientation within the integral nut-retaining cradle 21, 41, 51 respectively. That is, according to aspects as shown in FIGS. 3a, 3b, 4 and 5, the dimension of the retainer is such that, when retainer sections 29a, 49a, 59a of retainers 29, 49, 59 engage the respective through-slots of integral cradle walls, the retainers are able to maintain a position that retains a nut 28, 48, 58 in a desired and predetermined approximate yet definable overall location in the integral cradle 21, 41, 51, and substantially proximate to integral cradle bed 22, 42, 52, even though a nut may be allowed to move slightly, or "float" a predetermined distance within the integral cradle bed in the direction substantially parallel to the integral cradle walls, and move or "float" a slight predetermined distance in the direction substantially perpendicular to the integral cradle walls.

According to further aspects of the present disclosure, the geometric shape of the retainer may be continuous, or "closed". In such a continuous configuration, a retainer would not comprise retainer "ends" as shown in FIGS. 3a, 3b, 4, and 5, but sections of the retainer would still adequately engage through slots in the integral cradle walls.

Further aspects contemplate a retainer having a suitable and predetermined dimension and geometry to exert sufficient and predetermined outward force such that the retainer would remain in position between integral cradle walls while retaining a nut in a desired and/or predetermined location proximate to the integral cradle bed.

According to further aspects, to assist a substantially fixed positioning of the retainer between the integral cradle walls, the inner surfaces of the cradle walls may comprise recesses dimensioned to receive sections of the retainer. The predetermined outward force of the retainer, forces section of the retainer to engage and otherwise "seat" into the recesses in the integral cradle wall inner surfaces. In an aspect, such recesses may be substantially linear in the form of a recessed groove or grooves substantially parallel with the lengthwise direction of the respective cradle wall. However, further aspects contemplate any form of recess able to engage and retain a section of the retainer for the purpose of retaining the nut in a predetermined position proximate to the integral nut-retaining cradle. Such recesses include, without limitation dimples, or any type of depression formed integrally or later machined into the surfaces of the integral nut-retaining cradle walls. Still further, aspects of the present disclosure contemplate additively manufactured features that may protrude from the inner wall surfaces or outer wall surfaces of the integral nut-retaining cradle walls to facilitate positioning and retention of a nut in the integral nut-retaining cradle. Further aspects contemplate such recesses or protrusions engaging directly with a feature or features of the nut itself, thus obviating or being used in concert with a retainer to facilitate positioning and retention of a nut in the integral nut-retaining cradle. Still further aspects contemplate any form of recess able to engage and retain a section of the retainer for the purpose of retaining the nut in a predetermined position proximate to the integral nut-retaining cradle, including recesses that comprise recess portions that pass completely through the integral cradle walls.

The retainers may be made from any useful material including, without limitation, metal-containing and non-metal-containing materials. Since the intended function of the retainer essentially ceases upon the insertion and tightening of a mating fastener dimensioned to engage with the nut, such retainer material may be selected based on weight, cost etc., without regard for any particular material robustness relative to particular strength or ability to sustain any particular load or stress.

FIGS. 6a-6f are overhead plan perspective views of aspects according to the present disclosure illustrating non-limiting and non-exhaustive representative geometries and dimensions for retainers used in conjunction with additively manufactured integral nut-retaining cradles additively manufactured integrally with a part. Therefore, FIGS. 6a, 6b, 6c, 6d, 6e, and 6f show additively manufactured parts comprising an aspect of the present disclosure, and showing manufactured nut-retaining cradles 61a, 61b, 61c, 61d, 61e, and 61f that are understood as being integral with an additively manufactured part (not shown); the parts being similar to those shown in FIG. 2a, 2b, 3a, 3b, 4 or 5.

As shown in FIG. 6a, nut-retaining cradle 61a comprises an integral cradle bed 62a and integral cradle walls 63a and 64a extending a predetermined distance from integral cradle bed 62a with the integral cradle walls 63a, 64a built via additive manufacturing and oriented substantially perpendicular to the integral cradle bed 62a. According to one aspect as shown in FIG. 6a, integral cradle bed 62a defines an opening 62a' extending through the integral cradle bed 62a and through the additively manufactured integral part (not shown). According to an illustrated aspect, integral cradle walls 63a, 64a comprise recesses 65a, 66a that do not extend all the way through integral cradle walls 63a, 64a respectively. As shown, recesses 65a, 66a extend from integral cradle wall inner surfaces to a predetermined distance into the integral cradle walls 63a, 64a respectively. Integral cradle bed 62a as shown in FIG. 6a further comprises integral cradle bed nut-orienting features 67a', 67a" extending a predetermined distance from integral cradle bed 62a, or in a "raised" fashion with respect to the integral cradle bed 62a.

As shown in FIG. 6a, retainer 69a is shown positioned proximate to nut 68a with retainer section 69a' inserted into and engaging recess 65a of integral cradle wall 63a and retainer section 69a" inserted into and engaging recess 66a of integral cradle wall 64a. In an aspect, the predetermined dimension and/or geometry of retainer 69a is such that retainer 69a remains in position in the integral nut-retaining cradle 61a and proximate to the nut 68a, thus retaining the nut 68a in the integral nut-retaining cradle 61a. FIGS. 6b-6f show various alternate and non-exhaustive geometries and/or dimensions for retainers and/or recesses in the integral nut-retaining cradle 61a used to retain nut 68a as shown in FIG. 6a.

FIG. 6b shows the retainer 69a (shown in FIG. 6a) positioned proximate to nut 68a with retainer section 69a' inserted into and engaging recess 65b of integral cradle wall 63b and retainer section 69a" inserted into and engaging recess 66b of integral cradle wall 64b. In an aspect as shown in FIG. 6b, the predetermined dimension and/or geometry of retainer 69a is such that retainer 69a remains in position in the integral nut-retaining cradle 61a and proximate to the nut 68a, thus retaining the nut 68a in the integral nut-retaining cradle 61a. However, as shown in FIG. 6b, the recesses 65b and 66b are configured and additively manufactured to a dimension and/or geometry that more closely matches or otherwise more closely approximates the dimension and/or geometry of sections 69a' and 69a" of retainer 69a. The remainder of the features shown in FIG. 6b (but not enumerated) is understood to be those shown in FIG. 6a.

FIGS. 6c, 6d, 6e and 6f show further aspects of the present disclosure where multiple retainers are shown positioned proximate to nut 68a. In FIG. 6c, the nut-retaining function is accomplished via the predetermined placement of two retainers 69c' and 69c". As shown, a first end of retainer 69c' engages recess 65c of integral cradle wall 63c, and a second end of retainer 69c' engages recess 66c of integral cradle wall 64c. In addition, as shown in FIG. 6c, a first end of retainer 69c" engages recess 65c of integral cradle wall 63c, and a second end of retainer 69c" engages recess 66c of integral cradle wall 64c. The remainder of the features shown in FIG. 6c (but not enumerated) is understood to be those shown in FIGS. 6a and 6b.

In FIG. 6d, the nut-retaining function is accomplished via the predetermined placement of two retainers 69d' and 69d". As shown, a first end of retainer 69d' engages recess 65d' of integral cradle wall 63d, and a second end of retainer 69d' engages recess 66d' of integral cradle wall 64d. In addition, as shown in FIG. 6c, a first end of retainer 69d" engages recess 65d" of integral cradle wall 63d, and a second end of retainer 69d" engages recess 66d" of integral cradle wall 64d. As shown in FIG. 6d, the recesses 65d', 65d" and 66d', 66d" are configured and additively manufactured to a dimension and/or geometry that more closely matches or otherwise more closely approximates the dimension and/or geometry of first and second ends of retainers 69d' and 69d". The remainder of the features shown in FIG. 6d (but not enumerated) is understood to be those shown in FIGS. 6a-6c.

In FIG. 6e, the nut-retaining function is accomplished via the predetermined placement of two retainers 69e' and 69e". As shown, a first end of retainer 69e' engages through-slot 65e' of integral cradle wall 63e, and a second end of retainer 69e' engages through-slot 66e' of integral cradle wall 64e. In addition, as shown in FIG. 6e, a first end of retainer 69e" engages through-slot 65e" of integral cradle wall 63e, and a second end of retainer 69e" engages through-slot 66e" of integral cradle wall 64e. As shown in FIG. 6e, the through-slots 65e', 65e" and 66e', 66e" are configured and additively manufactured to a dimension and/or geometry that closely matches or otherwise closely approximates the dimension and/or geometry of first and second ends of retainers 69e' and 69e". The remainder of the features shown in FIG. 6e (but not enumerated) is understood to be those shown in FIGS. 6a-6d.

In FIG. 6f, the nut-retaining function is accomplished via the predetermined placement of two retainers 69f' and 69f". As shown, a first end of retainer 69f' engages through-slot 65f' of integral cradle wall 63f, and a second end of retainer 69f' engages through-slot 66f' of integral cradle wall 64f. In addition, as shown in FIG. 6f, a first end of retainer 69f" engages through-slot 65f" of integral cradle wall 63f, and a second end of retainer 69f" engages through-slot 66f" of integral cradle wall 64f. As shown in FIG. 6f, the through-slots 65f', 65f" and 66f', 66f" are configured and additively manufactured to a dimension and/or geometry that closely matches or otherwise closely approximates the dimension and/or geometry of first and second ends of retainers 69f' and 69f". In addition, as shown in FIG. 6f, the first and second ends of retainers 69f' and 69f" are shown extending past the outer wall of the cradle walls 63f and 64f via through slots 65f', 65f" and 66f', 66f" respectively. This aspect of retainer elements extending past the outer walls of the integral and additively manufactured cradle walls is understood as pertaining to any retainer used in conjunction with aspects of the present disclosure. The remainder of the features shown in FIG. 6f (but not enumerated) is understood to be those shown in FIGS. 6a-6e.

FIG. 7 is a flowchart outlining an aspect of the present disclosure directed to a method 70 for attaching a first component to a second component comprising positioning 72 an additively manufactured first component proximate to a second component, said first component comprising a nut plate, said nut plate comprising an additively manufactured nut-retaining cradle, with the additively manufactured nut-retaining cradle dimensioned to receive the nut and a nut retainer and, attaching 74 the additively manufactured first component to the second component.

FIG. 8 is a flowchart outlining an aspect of the present disclosure directed to a method 80 for attaching a first component to a second component comprising positioning 82 an additively manufactured first component proximate to a second component, said first component comprising a nut plate, said nut plate comprising an additively manufactured nut-retaining cradle, with the additively manufactured nut-retaining cradle dimensioned to receive the nut and a nut retainer, engaging 84 the nut plate of the first additively manufactured component and the second component with a fastener, fastening 86 the second component to the nut plate of the first additively manufactured component, and joining 86 the additively manufactured first component to the second component. According to a further aspect, the second component is also an additively manufactured component, and in yet another aspect, the nut plate is a rivetless nut plate.

According to the present disclosure, the terms "parts" or "parts" are used equivalently and interchangeably with the respective terms "component" or "components. Further, the term "nut plate" is used equivalently and interchangeably with the respective term "nut plate assembly". Additionally, the terms "recess" or "recesses" are used equivalently and interchangeably with the respective terms "depression", "depressions", "dimple", "dimples".

Further, aspects of the present disclosure contemplate the use of additively manufactured parts comprising the integral additively manufactured nut cradle to manufacture stationary structures comprising the additively manufactured parts. Such stationary structures include, without limitation, buildings, structural supports, bridges, trusses, and any structure comprising component and parts comprising nut plates.

Further aspects of the present disclosure contemplate the use of additively manufactured parts comprising the integral additively manufactured nut cradle to manufacture structural and other components for vehicles including, without limitation, aircraft (e.g. spars, ribs, stringers, etc.). Vehicles further include, without limitation, manned aircraft, an unmanned aircraft, a manned spacecraft, an unmanned spacecraft, a manned rotorcraft, an unmanned rotorcraft, a satellite, a rocket, a missile, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An additively manufactured part comprising:
an additively manufactured nut-retaining cradle integral with the additive manufactured part, said integral nut-retaining cradle comprising an integral cradle bed and at least one integral cradle wall, said integral cradle wall extending substantially perpendicularly from the integral cradle bed and said integral cradle wall extending from the integral cradle bed to a predetermined distance; and
wherein the integral cradle wall comprises at least one integral cradle wall nut-retaining feature, said integral cradle wall nut-retaining feature configured to receive a retainer, said retainer configured to engage the integral cradle wall nut-retaining feature, said integral cradle wall nut-retaining feature further configured to establish a restricted range of movement for a nut retained in the nut-retaining cradle along at least one axis.

2. The additively manufactured part according to claim 1, wherein the integral cradle wall nut-retaining feature comprises at least one recess in at least one integral cradle wall.

3. The additively manufactured part according to claim 2, wherein the recess extends through the integral cradle wall.

4. The additively manufactured part according to claim 2, wherein the recess comprises a through-slot extending through the integral cradle wall.

5. The additively manufactured part according to claim 1, wherein the retainer is selected from the group consisting of: a clip; a pin; a continuous ring; a discontinuous ring; and combinations thereof.

6. The additively manufactured part according to claim 1, wherein the nut comprises a floating nut.

7. The additively manufactured part according to claim 1, wherein the integral cradle bed comprises at least one integral cradle bed nut-orienting feature, said integral cradle bed nut-orienting feature configured to establish a restricted range of movement for a nut retained in the integral cradle bed along at least one axis.

8. The additively manufactured part of claim 7, wherein the integral cradle bed nut-orienting feature comprises a post, said post extending a predetermined distance from the integral cradle bed.

9. The additively manufactured part according to claim 1, wherein the integral cradle bed comprises:
   a cradle bed upper surface, said cradle bed comprising a predetermined thickness, and
   wherein the integral cradle bed upper surface extends a predetermined distance from a surface of the additively manufactured part.

10. The additively manufactured part according to claim 1, wherein the integral cradle bed comprises:
    a cradle bed upper surface; and
    wherein the integral cradle bed upper surface is substantially flush with a surface of the additively manufactured part.

11. The additively manufactured part according to claim 1, wherein the additively manufactured part comprises a non-metallic material, said non-metallic material selected from the group consisting of: a thermoset plastic material; a thermoplastic material; a composite material; a ceramic material; a carbon fiber-containing material;
    a boron fiber-containing material; a glass fiber-containing material; an aramid fiber-containing material; polytetrafluoroethylene; polyethylene terephthalate; glycol modified polyethylene terephthalate; and combinations thereof.

12. The additively manufactured part according to claim 1, wherein the additively manufactured part comprises a metallic material, said metallic material selected from the group consisting of: titanium; a titanium alloy; steel; aluminum; an aluminum alloy; cobalt; a cobalt alloy; bronze; copper; a copper alloy; and combinations thereof.

13. A structure comprising the additively manufactured part of claim 1.

14. An additively manufactured part comprising:
    an additively manufactured nut-retaining cradle integral with the additive manufactured part, said integral nut-retaining cradle comprising an integral cradle bed and at least one integral cradle wall, said integral cradle wall extending substantially perpendicularly from the integral cradle bed and said integral cradle wall extending from the integral cradle bed to a predetermined distance; and
    wherein the integral cradle wall comprises at least one integral cradle wall nut-retaining feature, said integral cradle wall nut-retaining feature configured to receive a retainer, said retainer configured to engage the integral cradle wall nut-retaining feature, said integral cradle wall nut-retaining feature further configured to establish a restricted range of movement for a nut retained in the nut-retaining cradle along at least one axis;
    wherein the vehicle is selected from the group consisting of: a manned terrestrial vehicle; an unmanned terrestrial vehicle; a manned aircraft; an unmanned aircraft; a manned rotorcraft; an unmanned rotorcraft; a manned spacecraft; an unmanned spacecraft; a manned surface water borne vehicle; an unmanned surface water borne vehicle; a manned sub-surface water borne vehicle; an unmanned sub-surface water borne vehicle; a satellite; a rocket; a missile; and combinations thereof.

15. A method of manufacturing a part, the method comprising:
    using an additive manufacturing process to construct a part; and
    forming a nut-retaining cradle for a nut plate assembly, said nut-retaining cradle additively manufactured integrally with the part and comprising a cradle bed and at least one integral cradle wall that includes at least one integral cradle wall nut-retaining feature configured to receive a retainer and further configured to establish a restricted range of movement for a nut retained in the cradle bed.

16. The method according to claim 15, wherein the additive manufacturing process is selected from the group consisting of: direct energy deposition; direct metal laser sintering; direct metal printing; electron beam additive manufacturing; electron beam melting; electron beam powder bed; fused deposition modeling; indirect powder bed; laser cladding; laser deposition; laser deposition welding; laser deposition welding/integrated milling; laser engineering net shaping; laser freeform manufacturing; laser metal deposition with powder; laser metal deposition with wire; laser powder bed; laser puddle deposition; laser repair; powder directed energy deposition; stereolithography; selective laser melting; selective laser sintering; small puddle deposition, and combinations thereof.

17. The method according to claim 15, wherein, in the step of using an additive manufacturing process to construct a part, the part selected from the group consisting of: comprises a non-metallic material, said non-metallic material comprising: a thermoset plastic material; a thermoplastic material; a composite material; a ceramic material; a carbon fiber-containing material, a boron fiber-containing material; a glass fiber-containing material; an aramid fiber-containing material; polytetrafluoroethylene; polyethylene terephthalate; glycol modified polyethylene terephthalate; or combinations thereof.

18. The method according to claim 15, wherein, in the step of using an additive manufacturing process to construct a part, the part comprises a material selected from the group consisting of: a metallic material, said metallic material comprising: titanium; a titanium alloy; steel, aluminum; an aluminum alloy; cobalt; a cobalt alloy; bronze; copper; a copper alloy; and combinations thereof.

19. The method according to claim 15, wherein, in the step of forming a nut-retaining cradle, said nut-retaining cradle is dimensioned to orient a nut.

20. A part manufactured according to the method of claim 15.

* * * * *